Patented Sept. 7, 1937

2,092,054

UNITED STATES PATENT OFFICE 2,092,054

PROCESS FOR GRANULATING MATERIALS

Frank J. De Rewal, Camillus, N. Y., assignor, by mesne assignments, to The Solvay Process Company, New York, N. Y., a corporation of New York No Drawing. Application June 17, 1933,
Serial No. 676,330

4 Claims. (Cl. 71—30)

This invention relates to a process for granulating materials, and particularly to a process for preparing granulated fertilizers, for example, alkali metal nitrates (sodium or potassium nitrate), ammonium nitrate, mixtures of ammonium nitrate and calcium carbonate, etc.

When sodium nitrate, for example, is to be used as a fertilizer, particularly by broadcasting, a material which is in small particles is readily carried away by the wind and is lost. Also, a material which is in the form of finely divided particles tends to cake more severely than a material which substantially consists of relatively large particles.

While sodium nitrate may be produced in the form of relatively large crystals which are suitable in their physical characteristics for employing the nitrate as a fertilizer, the production of large crystals is difficult and expensive. It is an object of this invention, therefore, to provide a process for the economical production of relatively large granules of materials, which granules are relatively rugged and resist disintegration in handling, and are peculiarly suitable to distribution to the soil.

A material may be granulated in accordance with the process of this invention by incorporating with the solid finely divided material a substantially anhydrous melt containing a plurality of fusible materials which form a eutectic mixture, and cooling and comminuting the resulting mass. The finely divided material thus incorporated in a granular product may itself melt in part and thus be present in the melt which is incorporated with the remaining solid material, or it may be a relatively infusible substance with which is incorporated a melt containing two or more other materials which themselves form a eutectic mixture. In treating a fusible finely divided solid in accordance with this invention it may be heated with a minor proportion of a second material or materials in such a way as to melt a portion only of the mixture. The added materials are then preferably so chosen that this melting may be accomplished at temperatures relatively low in comparison with the melting point of the major constituent of the mixture. The heated materials are actively mixed to assure uniformity of composition, and then cooled and comminuted to form the desired granulated product. In the case of sodium nitrate or potassium nitrate, for example, a substantially anhydrous mixture of sodium nitrate or potassium nitrate and a minor proportion of ammonium nitrate may be heated to a temperature at which a portion only of the mixture is melted, the heated material stirred and cooled and comminuted to obtain a granular product. Instead of ammonium nitrate, other salts, particularly ammonium salts such as ammonium sulfate, ammonium phosphate, urea and ammonium chloride, may be employed for mixing with the sodium nitrate or potassium nitrate.

The process of this invention also may be carried out by heating a substantially anhydrous mixture of two or more materials to a temperature above the eutectic melting point of the system to which the mixture corresponds but which is materially below the melting points of the separate constituents of the mixture, to obtain a semi-fused mass. This semi-fused mass is cooled to a plastic condition with stirring, to cause a cementing of the mass. The coherent material is then comminuted into particles of the desired size, and the particles may then be dried, if desirable, and may be cooled to atmospheric temperatures. It is sometimes of advantage to carry out the cementing of the mixture in two steps, in the first of which the mixture is heated to fuse a portion, and in the second step is stirred and cooled to a lower temperature to reduce the proportion of liquid phase and to cause the material to cohere before further cooling and comminuting to obtain the final granulated product.

In order to understand the general principles underlying the process of this invention which dictate the preferred conditions to be maintained in the granulation of any specific mixture of materials, the following discussion of the granulation of sodium nitrate-ammonium nitrate mixtures is given. In this specification and in the claims all quantities of materials are given in parts or percentages by weight unless otherwise stated in specific instances.

Pure sodium nitrate and pure ammonium nitrate melt at about 308° C. and 170° C., respectively. A eutectic mixture of these substances contains about 20 parts by weight of sodium nitrate and about 80 parts by weight of ammonium nitrate and the eutectic temperature (the melting point of the eutectic mixture) is about 120° C. Mixtures containing the two salts in proportions other than that of the eutectic mixture when heated to about 120° C. will melt in part but will not completely melt until heated to some higher temperature the exact value of which is dependent upon the proportions of sodium nitrate and ammonium nitrate in the mixture. Granulation of mixtures of sodium nitrate and ammonium nitrate in which the ammonium nitrate constitutes a minor proportion may be accomplished by heating the mixture to a temperature above 120° C., for example to 130° C., to melt a portion of the mixture and then cooling the mixture while it is actively stirred to cause solidification of the melted material in amount sufficient to give the mass a desired consistency for granulating it according to the method selected for the granulation. After or during the step of comminuting the mixture, the particles are further cooled to complete solidification of the fused portion. If desired, the stirring of the partially fused mixture may be discontinued after the mass has been thoroughly mixed and the material may be cooled in a single operation to form a solid cake which may then be broken up into particles of a desired size.

As an example of the process described, a mixture of 80 parts sodium nitrate and 20 parts ammonium nitrate may be heated to a temperature of about 130° C., at which about 35% by volume of the mixture is in the liquid phase, and the material stirred thoroughly to mix the ingredients and to wet the solid crystals with the melted portion. The mixture is then cooled to about 120° C. and enough of the melted material solidified so that about 10% to 25%, preferably about 20%, (by volume) of the total mass is liquid. The material is stirred during the heating and cooling. Under these conditions the cooled material is of a proper plasticity for granulating it by crumbling through a screen or grid. The material is comminuted by forcing it through a screen and the particles are cooled, while being agitated to prevent them sticking together, until the temperature is lowered to below the eutectic temperature of the constituents of the material, which in the case of sodium nitrate and ammonium nitrate, is accomplished when the temperature falls below about 120° C. By controlling the conditions of treatment in the manner pointed out so that about 10% to 25% by volume of the mixture is melted when the material is granulated by forcing it through a screen, a granulated material having desirable characteristics may be readily obtained. If more than 20% by volume is in the liquid form, there is a tendency for the granules passing the screen not to have sufficient strength to retain their shape during the subsequent cooling treatment and the granules tend to cohere together and form lumps. If less than 10% by volume of the mixture is in the liquid form, unnecessarily large amounts of power are required to force the material through the screen and excessive quantities of fines are formed.

The presence of relatively small quantities of impurities which ordinarily occur in commercial products that may be granulated by this process alters the conditions of preferred temperature of operation from those indicated above, but, in general, does not affect the main principles or methods. For example, the $NaNO_3$ may contain small quantities of NaCl, $NaNO_3$ and moisture, whereas the $NH_4NO_3$ may contain other ammonium salts and moisture. The effect of these impurities is generally to lower the temperatures at which liquid phases may be formed, and consequently to lower the temperatures of the mixing and comminuting steps of the present invention. The extent of lowering is dependent upon the nature and quantity of the impurities present. Thus, when 80 parts of commercial $NaNO_3$ containing about 0.2% NaCl and smaller proportions of other impurities are mixed with 20 parts of technically pure $NH_4NO_3$, containing 34.8% N, the mixture may best be treated by warming to about 125° C., and cooling while mixing to about 105° C., at which temperature it is granulated by crumbling through a screen. In the case of a mixture of 80 parts of the same grade of $NaNO_3$ with 20 parts of by-product $(NH_4)_2SO_4$, the whole mixture containing approximately 0.5% $H_2O$, the preferred conditions are warming to about 115° C. and mixing and cooling to about 85 to 99° C. before granulation. Also when mixtures are prepared from materials which chemically react to form new compounds, the presence of these reaction products alters the preferred conditions of operation in like manner as does the presence of impurities.

As noted above, the mixture of materials at the time of granulating should contain a given proportion in the melted condition. In cooling a partially fused mixture of relatively pure materials, once any excess of one of the constituents over the amount corresponding to the eutectic mixture has crystallized, the crystallization of the remaining molten portion (which is a eutectic mixture) takes place at a substantially constant temperature, the eutectic temperature. In cooling such a mixture to solidify all but a definite proportion, the point at which the desired proportion is still molten cannot be determined by observing the temperature of the mixture when the materials are present in such proportions that the eutectic mixture constitutes a greater portion of the mixture than it is desired to retain in the molten condition. In such a case it is frequently desirable to introduce a small proportion of another material which will permit cooling the mixture somewhat below the eutectic temperature while still retaining the desired proportion of the mixture in the liquid phase, a proportion sufficient to give a proper plasticity to the mixture for granulation purposes. This added material may be a small amount of a fusible solid, or it may be a liquid. For example, a small quantity (up to about 3%) of water may be used for this purpose, but more than this amount of water should not be present in order that the mixture treated in accordance with this invention may be substantially anhydrous. This mode of operating permits of controlling the process by observation of the temperatures of the mixture, once the process has been standardized for a given amount of impurity, since as solidification of the eutectic mixture takes place the content of impurity in the remaining melted material progressively increases and thus causes a progressive lowering of the temperature at which further quantities of the melt solidify.

The following examples are illustrative of processes for the preparation of granular products in accordance with this invention:

*Example I.*—About 900 parts of a solid, substantially dry commercial sodium nitrate containing minor quantities of impurities and about 100 parts of solid dry technically pure ammonium nitrate are mixed. The sodium nitrate and ammonium nitrate should be in sufficiently fine particles to pass a 35 mesh screen. The mixture is heated with stirring to about 130° C., during which heating it may be observed that the mixture takes on the appearance of becoming wet at about 100° C. with the liquid phase increasing to about 40% by volume of the total mass as the temperature is raised. The heated mixture is then allowed to cool to about 105° C. while being stirred, during which the liquid phase decreases as the temperature drops, although at 105° C. about 20% by volume of the mixture is still in the liquid phase and the mass somewhat plastic rather than dry and brittle. At this temperature the mixture may be comminuted by crumbling it through a screen, for example, and the resulting cooled product is principally in the form of hard, dry granules.

Mixtures of the above grades of sodium nitrate and ammonium nitrate containing from about 80 to 95 parts of sodium nitrate to 5 to 20 parts of ammonium nitrate may be treated at substantially the same temperatures and, by the same manipulative steps, to produce the desired granulated product.

*Example II.*—Ammonium nitrate and sodium nitrate, both being ground to pass a 60 mesh screen, are fed into a mixer in the proportions of 5 to 20 parts of ammonium nitrate for every 95 to 80 parts of sodium nitrate. The finely divided material is mixed and heated, for example, by a stream of hot air to fuse a portion only of the mixture. For anhydrous material a suitable temperature is one within the range of about 100° C. to 140° C. If the ammonium nitrate-sodium nitrate mixture contains moisture, the preferred temperatures will be somewhat lower, for example, with about 0.5 per cent to 1.5 per cent moisture in the materials fed into the mixer, a suitable temperature is within the range of about 65° C. to 100° C.

The mixture being heated is actively stirred to give a uniformity of composition in the finished product and to avoid local overheating. The heating should be at a rate which avoids fusing an excessive amount of the mixture. For example, it is preferred to fuse about 35% to 45% by volume of the mixture. The heated mixture is in a physical condition resembling that of wet sand.

The plastic mixture thus obtained is discharged from the mixer to, for example, a graining pan or rotary granulator where it is cooled and grained to form the desired comminuted granular particles. It has also been found that the cooling of the partially fused mixture of ammonium nitrate and sodium nitrate preparatory to comminuting it, may advantageously be carried out by fusing somewhat more than 45% by volume of the mixture, but not more than about 75% by volume, and feeding the somewhat fluid mixture to a cooled rotating drum on which it is cooled until it has the desired plasticity (when about 20% by volume is in the form of a liquid phase). At this stage of the cooling the material is removed from the drum and granulated through a screen or grid.

The methods of the foregoing examples have involved preparing a mixture of two or more ingredients and heating the mixture to a temperature at which a portion only is liquefied. The preparation of this partially liquid mass may likewise be accomplished by mixing two or more of the ingredients in about the proportions corresponding to the eutectic mixture. This mixture is then heated to complete fusion and further quantities of one or more of the solid finely divided ingredients are added and incorporated with the liquid fusion while maintaining the mixture at a temperature at which the desired proportion is in the liquid phase. The mass thus prepared may be treated as described above to convert it into the granular solid.

In preparing a granular sodium nitrate product by employing this method a mixture of about 20 parts by weight of sodium nitrate and about 80 parts by weight of ammonium nitrate may be heated to a temperature of 120° C. or above at which the mixture is molten and with the melt thus prepared the desired proportion of solid sodium nitrate may be incorporated while maintaining the mixture at a temperature above 120° C. The resulting mass is then cooled and granulated as described above.

The following examples are further illustrative of the preparation of fertilizers in accordance with this modification of the invention:

*Example III.*—A mixture of about 54 parts by weight of ammonium nitrate and about 13 parts by weight of sodium nitrate is heated at a temperature of about 135° C. to form a melt. About 33 parts of finely divided limestone are added to and thoroughly incorporated with the molten ammonium nitrate and sodium nitrate. The resulting mass is cooled to about 117° C. at which temperature it is forced through a screen and the granular product then cooled to room temperature.

In place of forming a melt of ammonium nitrate and sodium nitrate to which the calcium carbonate is added, a melt containing ammonium nitrate and urea may be employed.

*Example IV.*—A mixture of about 92 parts of ammonium nitrate and 8 parts sodium chloride is heated to a temperature of about 127° C. and to the melt thus obtained about 67 parts of finely divided calcium carbonate is added. After thoroughly incorporating the solid calcium carbonate with the melt, the mass is cooled to about 90° C. and at that temperature is forced through a screen and the resulting granular material cooled to ordinary temperatures.

It will be noted that the process of this invention permits of granulating a substantially anhydrous mixture of two or more materials by means of a melt of two or more constituents of the mixture at temperatures materially below the melting points of the separate constituents. This feature of the invention is of particular importance in the preparation of fertilizers containing ammonium nitrate and calcium carbonate. At the relatively high temperatures required for incorporating finely divided calcium carbonate with substantially anhydrous ammonium nitrate to obtain a mass fluid enough to permit of thorough incorporation of the ingredients and comminuting the mixture by spraying or by forcing it through a sieve, there is an undesirable reaction between the ammonium nitrate and calcium carbonate to liberate ammonia and form calcium nitrate. It has heretofore been necessary, therefore, in preparing such fertilizers to employ sufficient water to make the melt fluid at temperatures below those at which the undesirable reaction takes place. Such a procedure involves a drying of the comminuted material to fit it for storage and distribution to the trade. By employing the process of this invention, a satisfactorily dry granular ammonium nitrate-calcium carbonate fertilizer may be prepared directly, without the necessity of a treatment of the granules to dry them, and an undesirable reaction of the ammonium nitrate and calcium carbonate avoided by preparing and granulating the mixed materials at relatively low temperatures.

If the materials treated in accordance with the foregoing processes are of such purity that substantially no liquid phase remains after cooling the mixture below the eutectic melting point corresponding to the main constituents of the mixture, the granulated material may be sent to storage without further treatment. If, however, the impurity content of the mixture is relatively high and of such a nature as to increase the proportion of liquid phase present at the granulating temperatures, cooling the granulated material to a temperature of about 40° C. or lower before putting it into storage may be desirable in order to minimize caking of the granules during storage. This cooling may be accomplished in a rotary drum or cooler, employing, preferably, a cocurrent flow of the material and of a cooling gas such as air. If, in some cases, it should be desirable to dry the granulated material, this may be accomplished by passing air in contact with the granules either before or simultaneously with their cooling. Suitable temperatures for this drying are about 80° to 100° C. for the warm air entering the drier, and about 40° to 60° C. for the air leaving the drier after being passed in contact with the granulated mixture.

While the granulated product obtained from the foregoing processes is in general suitable for shipment and use as a fertilizer, if desired any small particle material may be screened out and incorporated with fresh materials which are heated and granulated in the manner described.

Materials other than ammonium nitrate may be utilized for the granulation of sodium nitrate. Thus, mixtures of 90 parts sodium nitrate and 10 parts ammonium sulfate, or of 80 parts sodium nitrate and 20 parts ammonium sulfate, and mixtures of 90 parts sodium nitrate and 10 parts monoammonium phosphate, or 80 parts sodium nitrate and 20 parts monoammonium phosphate may be granulated in the manner described. Again, the process of this invention may be utilized for the granulation of mixtures containing 75 to 92 parts of sodium nitrate to 25 to 8 parts of urea. Nor is the process of this invention limited to the granulation of mixtures of sodium nitrate or to the use of but a single material for addition to the sodium nitrate or other material which is to be granulated. Sodium nitrate may be granulated with an addition of two or more of the ammonium salts, ammonium nitrate, sulfate, phosphate, chloride or urea. Mixtures of sodium nitrate and anhydrous calcium nitrate, mixtures of ammonium sulfate and ammonium phosphate, or complete fertilizer mixtures, such as those containing ammonium nitrate, ammonium phosphate and a potash salt or salts, may be granulated in accordance with the process described, with an appropriate adjustment in the specific details of temperature, proportions of materials, etc. Also, the following mixtures may be granulated in accordance with this invention:

69 to 90 parts of ammonium sulfate and 31 to 10 parts of urea;
52 to 84 parts of ammonium nitrate and 48 to 16 parts of urea;
77 to 93 parts of potassium nitrate and 23 to 7 parts of urea.

To obtain good granulation and a uniform composition of product, the solid materials to be treated in accordance with this invention should have a particle size smaller than about 35 mesh, and preferably smaller than about 60 mesh.

I claim:

1. The process for granulating sodium nitrate which comprises mixing with solid sodium nitrate a minor proportion of ammonium nitrate, heating the resulting mixture to fuse a portion of the mixture within the range of about 30% to about 45% by volume thereof, cooling the mixture to a temperature at which about 10% to 25% by volume is a liquid, and at said temperature comminuting the mixture.

2. The process for granulating sodium nitrate which comprises mixing with solid finely divided sodium nitrate a minor proportion of a material selected from the group consisting of ammonium nitrate, ammonium sulfate, monoammonium phosphate, ammonium chloride, and urea, heating the resulting mixture to fuse a portion of the mixture within the range of about 30% to about 45% by volume thereof, cooling the mixture to a temperature at which about 10% to 25% by volume is in the liquid phase and the mixture forms a plastic mass, and at said temperature comminuting the plastic mass to form granules.

3. The process for granulating sodium nitrate which comprises mixing with solid sodium nitrate a minor proportion of a material selected from a group consisting of ammonium nitrate, ammonium sulfate, monoammonium phosphate, ammonium chloride, and urea, said mixture also containing a smal proportion but not over 3% of water, heating the mixture of materials to fuse a portion of the mixture within the range of about 30% to about 45% by volume thereof, cooling the mixture to a temperature at which about 10% to 25% by volume is in the liquid phase and the mixture forms a plastic mass, said water being effective to maintain the plasticity of the mixture over a range of temperatures, and comminuting the plastic mass while it contains about 10% to 25% liquid phase.

4. The process for granulating sodium nitrate which comprises incorporating with solid finely divided sodium nitrate a melt containing sodium nitrate and a material selected from the group consisting of ammonium nitrate, ammonium sulfate, monoammonium phosphate, ammonium chloride and urea, said melt being present in amount equivalent to about 30% to about 45% by volume of the total mixture, cooling the mixture to a temperature at which about 10% to 25% by volume is in the liquid phase and the mixture forms a plastic mass, and at said temperature comminuting the plastic mass to form granules.

FRANK J. DE REWAL.